(12) United States Patent
Edwards

(10) Patent No.: US 12,524,825 B2
(45) Date of Patent: Jan. 13, 2026

(54) INSPECTION OF DIGITAL IMAGES THROUGH WATERMARKS

(71) Applicant: GeoSnapShot Pty Ltd, Mona Vale (AU)

(72) Inventor: Andrew John Edwards, Dee Why (AU)

(73) Assignee: GeoSnapShot Pty Ltd, Mona Vale (AU)

( * ) Notice: Subject to any disclaimer, the term of this patent is extended or adjusted under 35 U.S.C. 154(b) by 358 days.

(21) Appl. No.: 18/226,348

(22) Filed: Jul. 26, 2023

(65) Prior Publication Data

US 2024/0037688 A1  Feb. 1, 2024

Related U.S. Application Data

(60) Provisional application No. 63/369,607, filed on Jul. 27, 2022.

(51) Int. Cl.
*G06T 1/00* (2006.01)
*G06F 3/04845* (2022.01)

(52) U.S. Cl.
CPC ........ *G06T 1/0028* (2013.01); *G06F 3/04845* (2013.01); *G06F 2203/04806* (2013.01)

(58) Field of Classification Search
CPC ............... G06T 1/0028; G06T 1/0021; G06T 2201/0065; G06F 3/04845; G06F 2203/04806; G06F 2203/04805; H04N 1/387; H04N 21/8358
See application file for complete search history.

(56) References Cited

U.S. PATENT DOCUMENTS

| | | | |
|---|---|---|---|
| 7,046,818 B2 | 5/2006 | Ratnakar | |
| 8,635,161 B2 | 1/2014 | Vial | |
| 8,891,811 B2 | 11/2014 | Alattar | |
| 2006/0062428 A1* | 3/2006 | Alattar | H04N 1/32288 382/100 |

FOREIGN PATENT DOCUMENTS

WO  2021/045781  3/2021

OTHER PUBLICATIONS

PCT/AU2023/050689, filed Jul. 27, 2023, International Search Report and Written Opinion, dated Oct. 13, 2023, 12 pages.

* cited by examiner

*Primary Examiner* — Christopher Wait
(74) *Attorney, Agent, or Firm* — Davis Graham & Stubbs LLP

(57) ABSTRACT

A digital image system includes a tool for enabling inspection of digital images through security marks. The system (300) generally includes a digital image source (310), a digital image publishing platform (320), and a user device (330). The source (310) includes storage (312) for storing digital images and a processor (316) for accessing images from the storage (312) and processing the image using a image processing module (314). The platform (300) includes an image database (322) and a processor (326). The processor (326) can access images from the database (322) and process the images using an inspection tool (324) to provide processed images that can be accessed by a user (330). The user device (330) includes a display (332) for displaying digital images accessed via the platform (320) as well as composite images generated by an inspection tool (336) including an inspection window free from security marks.

20 Claims, 4 Drawing Sheets

INSPECTION OF DIGITAL IMAGES THROUGH WATERMARKS

CROSS-REFERENCE TO RELATED APPLICATION

This application claims priority to U.S. Provisional Patent Application No. 63/369,607 entitled "Inspection of Digital Images Through Watermarks," filed Jul. 27, 2022, the contents of which are incorporated herein as if set forth in full and priority is claimed to the full extent allowable under U.S. law and regulations.

FIELD OF THE INVENTION

This application relates generally to wireless communication systems, including techniques for radio link control (RLC) packet discarding in wireless communication systems.

The present invention relates generally to tools for viewing digital images and, in particular, to a tool for enabling inspection of digital images through security marks such as watermarks.

BACKGROUND OF THE INVENTION

This application relates generally to wireless communication systems, including techniques for radio link control (RLC) packet discarding in wireless communication systems.

Providing digital images for inspection (e.g., analysis or simply viewing) by the public is indispensable in many contexts. For example, photographers and other content providers may market copies of digital images via portable storage devices and/or online displays. In other contexts, proprietary images may be produced in connection with business discussions, legal proceedings, or other activities. In many cases, the source of the digital images is concerned with preventing unauthorized copying of the digital images, a problem that specifically arises in the context of digital images available on computer networks.

One technique for enabling users to view digital images without copying them is to mark the digital image with a security mark such as a watermark. Generally, such security marks are overlaid or superimposed on the digital image such that any copy or display of the image bears the mark in at least a portion (often a central portion or strategically selected portion) of the image. Such marks are generally intended to enable sufficient access to the image so that the user can evaluate the image yet interfere with inspection of the image to an extent that the marked image is not a satisfactory substitution for the unmarked image. Unfortunately, in some cases, the security mark interferes with the image to the extent that the user cannot perform an adequate inspection, e.g., to determine whether to purchase a copy of the image.

SUMMARY OF THE INVENTION

This application relates generally to wireless communication systems, including techniques for radio link control (RLC) packet discarding in wireless communication systems.

The present invention relates to a tool for enabling inspection of digital images through security marks. A user can view a portion of the digital image in a movable inspection window free from interference due to the security mark, while the remaining area of the image remains secured. In one implementation, the portion displayed in the inspection window is enlarged or zoomed in relation to the original digital image. In this manner, users can fully inspect digital images without interference from the security marks while the image remains secure. Moreover, inspection is enhanced by the zoom feature as selected portions of the image can be viewed in greater detail.

In accordance with one aspect of the present invention, a method for enabling secure inspection of digital images is provided. The method involves providing a display device, such as a display of a phone, tablet computer, laptop computer, or other computer device, and operating the display device to display a first digital image having a security mark, where the security mark is rendered on a first area of the first digital image. The method further involves providing an inspection tool to enable inspection of digital images through security marks and operating the inspection tool for receiving a user input for controlling the position of an inspection window with respect to the display device. Such an inspection window may include a display area that is superimposed or otherwise presented on the display device, for example, in conjunction with a remaining portion of the digital image. In response to the input, the display device can be operated to select an inspection area that is at least partially within the first area. The display device is then operated to display, in the window, image information corresponding to the inspection area of the first digital image free from the security mark. In this manner, the first digital image can be fully inspected without interference while maintaining the security of the image.

The security mark can be removed from the inspection area in a various ways. For example, the inspection tool may be operative for accessing image information corresponding to the first digital image, distinguishing first imaging information corresponding to the first digital image from second image information corresponding to the security mark, and rendering the first information for display in the window. Alternatively, the inspection tool may be operative for deleting a portion of the first digital image including the security mark and reconstructing the deleted image portion with content that matches the existing background of the first digital image. The inspection tool may use text recognition, digital analysis, or artificial intelligence to identify the security marks and to reconstruct images as necessary. In any case, the system may obtain a second digital image corresponding to the first digital image but free from interference due to the security mark. The display device is then controlled to display the information of the first image outside of the window and information of the second digital image inside the window. For example, the information for the full first and second images may be delivered to the display device and the presentation rules for the display device may be configured such that the first image information is rendered as the foreground or visible image outside the window and the second image information is rendered as the foreground or visible image inside the window. The first and second windows are spatially registered so that the zoom portion in the second image matches the corresponding portion of the first image (though enlarged).

In accordance with another aspect of the present invention, a system is provided for enabling secure inspection of a digital image. The system generally includes a display device and an inspection tool. The display device is operative for displaying a first digital image having a security mark and for displaying a composite image including a portion of the first digital image together with a window displaying an inspection area. The inspection tool is operative for receiving a user input for controlling a position of the inspection window with respect to the display device and, responsive to user input, controlling the display device to position the imaging window over at least a portion of the first area. The inspection tool further controls the display device to display, in the window, an inspection area of the first digital image free from the security mark.

In some cases, the inspection tool may be used in an environment where the first digital image with the security mark is downloaded from a platform of a network such as the Internet. In such cases, the functionality of the inspection tool may be implemented at the network platform, at a user device, or distributed between the network platform and the user device (and potentially other devices or platforms). In any case, the tool may establish an inspection area, free from security marks, based on the user input such as the position of a cursor relation to the digital image, correlate the inspection area to inspection image information of the first image, and map the inspection image information to the window to display an inspection image portion. The inspection image portion may be enlarged as displayed in the window relative to the size of the inspection area in the first image, thereby creating a zoom effect. Moreover, a remaining portion of the first digital image, outside of the window, may be modified in the composite display. For example, the remaining portion may be chromatically altered (e.g., converted from color to black-and-white, shown in faded colors, or greyed-out), rendered in a reduced resolution, or distorted, for example, blurred. It will thus be appreciated that the composite image does not provide an opportunity to obtain an unauthorized, high-quality copy of a substantial portion of the first digital image.

BRIEF DESCRIPTION OF THE DRAWINGS

This application relates generally to wireless communication systems, including techniques for radio link control (RLC) packet discarding in wireless communication systems.

For a more complete understanding of the present invention, and further advantages thereof, reference is now made to the following detailed description, taken in conjunction with the drawings, in which.

DETAILED DESCRIPTION

This application relates generally to wireless communication systems, including techniques for radio link control (RLC) packet discarding in wireless communication systems.

The present invention relates to a system and associated functionality for securely inspecting digital images through security marks. The invention can be employed in a variety of environments, including inspection of digital images via the Internet or on a local machine or network. In the following description, the invention is set forth in the context of an Internet environment and with enhanced features such as a zoom feature and modification of the background image. However, it will be appreciated that the invention is not limited to these specific environments or features. Accordingly, the following description should be understood as exemplary and not by way of limitation.

Figure 1:
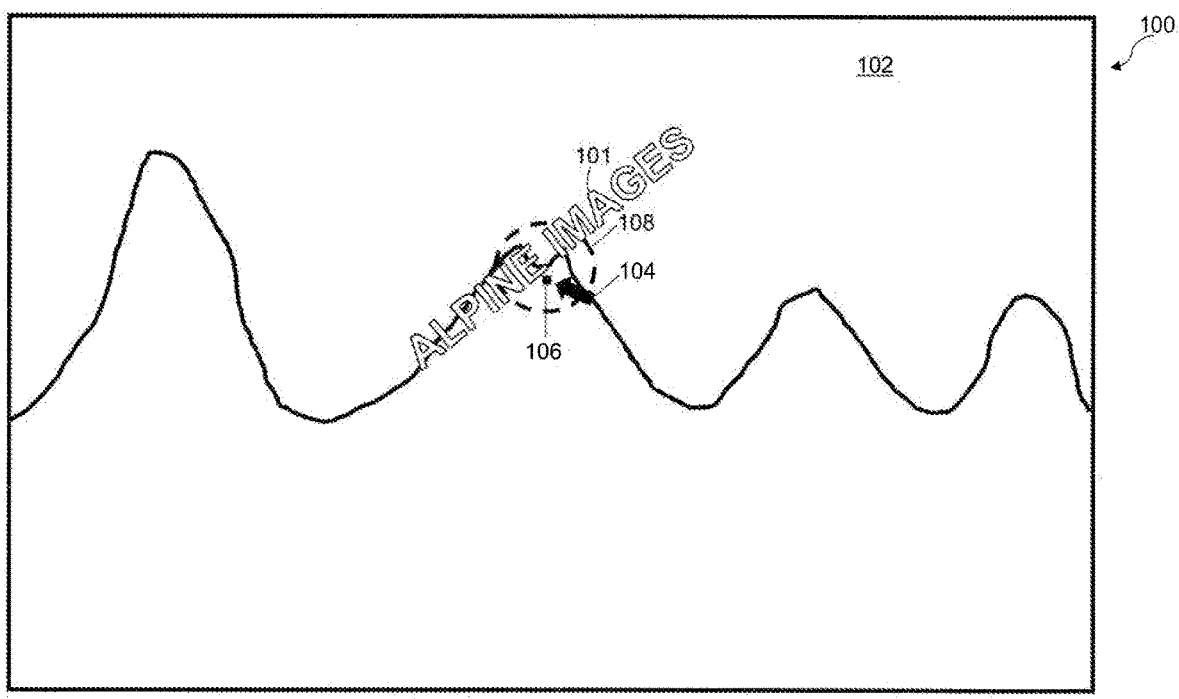
FIG. 1 shows a digital image bearing a security mark.

Referring to FIG. 1, a display device 100 is shown. The display device 100 displays a digital image 102 bearing a security mark 101 such as a watermark. In this case, the security mark 101 comprises semi-transparent text overlaid on a portion of the digital image 102. It will be appreciated that many such security marks may be provided on the digital image 102. In addition, the security marks may be distributed across the full image or strategically located to overlay portions of the digital image 102 that may be of particular interest. Although shown as comprising text, security marks may include patterns, designs, logos, and other matter. In general, the security marks are intended to enable a viewer to see enough of the image to be interested in the image but not enough to allow an unauthorized high-quality copy of the digital image.

Figure 2:
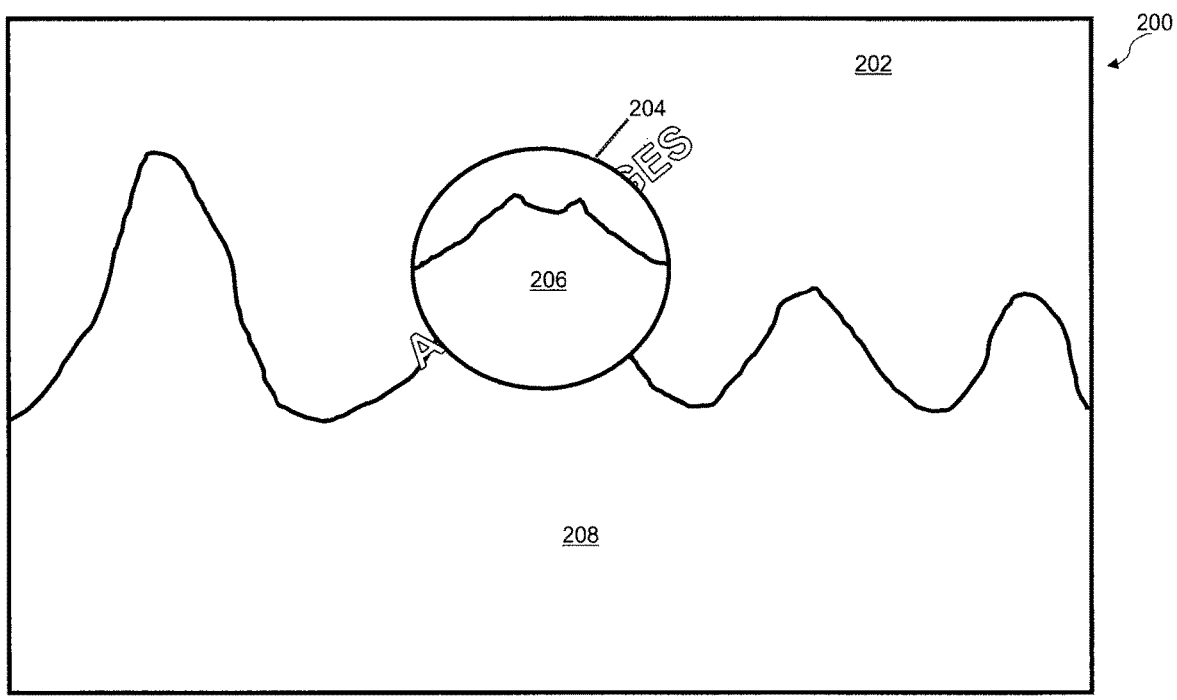
FIG. 2 shows the digital image of FIG. 1 with an inspection window allowing inspection of the image through the security mark.

As will be described in more detail below, the present invention enables the user to securely inspect portions of a digital image through security marks. In particular, the system generates an inspection window that the user can move around the digital image to inspect areas of the digital image free from interference due to the security mark. FIG. 2 illustrates a display device 200 (which is generally the same as but may be different than the display device of FIG. 1) rendering a composite digital image 202 in accordance with the present invention that includes an inspection window 204 and a remaining portion 208 of the digital image 202 outside of the window 204. As shown, the window 204 includes an inspection image portion 206 of the digital image 202 free from the security mark. The inspection image portion 206 corresponds to an inspection area 108 (FIG. 1) of the digital image 102. The inspection area 108 is defined relative to an inspection location 106 selected by a user by operating a cursor 104 or similar graphical element associated with a mouse, keyboard arrows, touchpad, touchscreen, or other input device. For example, the window may move as the user hovers over different parts of the image 202 or may appear when the user selects, e.g., by clicking, tapping, or the like, a part of the image 202.

As shown in FIGS. 1-2, the inspection image portion 206 may be enlarged in relation to the inspection area 108, thereby providing a zoom effect. It will be appreciated that the inspection tool thereby not only enables inspection free from interference due to security marks but also enables magnified inspection as may be desired. In addition, the remaining portion 208 of the composite digital image 202 outside of the window 204 may be modified. For example, the remaining portion 208 may be converted from color to black-and-white, may be rendered in faded colors, may be rendered in reduced resolution, may be greyed-out, or may be distorted such as by blurring, among other options. This may serve a number of purposes. For example, this may further discourage unauthorized persons from attempting to make copies of the image 202. In addition, modification of the background may cause the inspection image portion 206 to stand-out for enhanced inspection. Although the window 204 is shown as being circular, it will be appreciated that the window may be square, rectangular, or any other shape.

Figure 3:
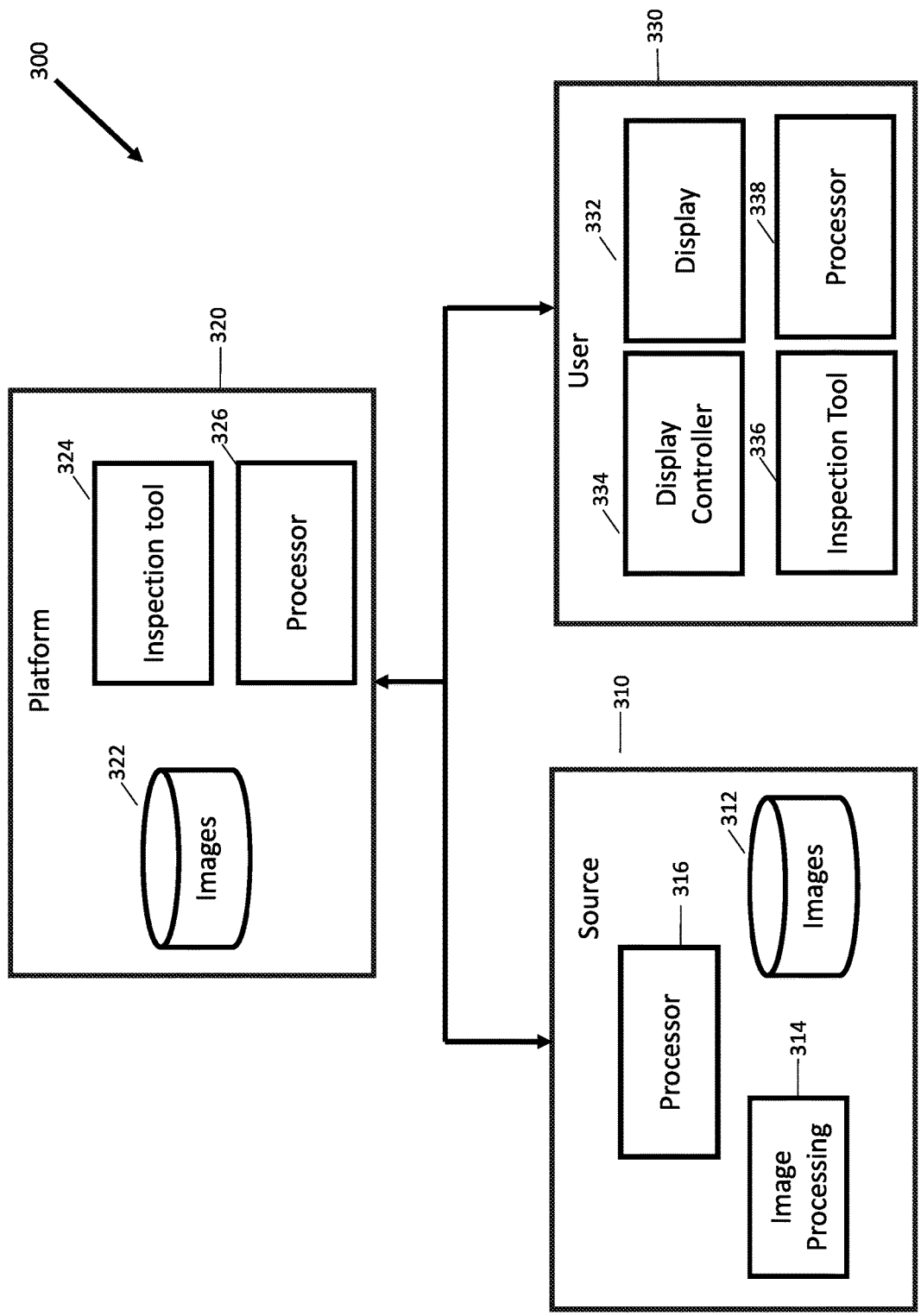
FIG. 3 is a schematic diagram of a digital image inspection system in accordance with the present invention.

FIG. 3 shows a digital image inspection system 300 in accordance with the present invention. The illustrated system 300 generally includes a digital image source 310, a digital image publishing platform 320, and a user device 330. Each of these elements will be described in turn below.

The digital image source 310 may be a machine or network associated with a source of digital images such as a digital image database system, a photography studio, or other entity that may desire to securely publish a digital image. The illustrated source 310 includes storage 312 for storing digital images, an image processing module 314, and a processor 316 for accessing images from the storage 312 and processing the image using the image processing module 314. The image processing module 314 may be embodied in a word processing application, image processing software, or other logic. The module 314 is generally operative for allowing the user to overlay or superimpose one or more security marks on a digital image. For example, the module 314 may allow a user to enter text or other designs, select a size for the marks, and select a position and orientation of the marks in relation to the digital image. A resulting image file including the digital image bearing the security marks can then be uploaded to the platform 320. For example, a single image file including the image with the security marks may be provided or separate files, e.g., including the original image and the image with the security marks, or including the original image and the security marks, may be provided. The source 310 may be embodied in one or more phones, tablet computers, laptop computers, computers of a local area network, or other data terminals.

The platform 320 may be an Internet-based digital image publishing site, a retail platform, a sales platform of a photography studio, or other platform where digital images are displayed and available to subscribers or the general public. The illustrated platform 300 includes an image database 322, an inspection tool 324 and a processor 326. The processor 326 can access images from the database 322 and process the images using the inspection tool 324 to provide processed images that can be accessed by a user 330. It will be appreciated that the functionality of the inspection tool 324 may be implemented on the platform 320, at the user device 330, or distributed between the platform 320 and the user device 330 (and/or other platforms or devices). For example, the inspection tool may be implemented as logic executed at a user device 330 for inspecting security marked digital images from a local source such as a flash drive or the like. Alternatively, the inspection tool 324 may be fully implemented on the platform 320. For example, the platform 320 may receive user inputs, such as keystrokes or cursor movements, from the user device 330. The inspection tool 324 can then use those user inputs to generate composite images (such as shown in FIG. 2) that can be viewed at the user device 330. As a still further alternative, the platform 320 may provide a digital image encoded such that a cooperating application of the user device 330 can readily distinguish the security marks from the underlying digital image to facilitate the inspection functionality. Many other implementations are possible in accordance with the present invention.

As will be described in more detail below, user devices 330 (only one shown in FIG. 3) of many users may communicate with the platform 320 to implement a variety of functionality. Although the platform 320 is illustrated as a single element, it will be appreciated that the platform 320 may be executed on one or more machines (e.g., computers or servers) at a single site or geographically distributed. Each such site may execute the full functionality of the illustrated platform 320 or the functionality may be distributed across sites. Moreover, the functionality may be distributed in various ways between the platform 320, the user devices 330, and other platforms (for example, sources 310, or other platforms that interact with the platform 320), e.g., some preprocessing of digital image information may be executed at the source 310 and/or platform 320, for example, to facilitate rapid response or reduce use of processing resources of the platform 320 or communication bandwidth requirements. The platform 320 may be hosted at the location of the provider of the system 300 or may be implemented separately (e.g., cloud-based) and connected to an operator as well as to other parties via appropriate interfaces such as APIs. For example, the provider of the inspection tool may be different than the operator of the digital image publishing platform 320 and may implement the inspection tool on a dedicated platform.

The user device 330 includes a display 332 for displaying digital images accessed via the platform 320 as well as composite images generated by an inspection tool 336 including an inspection window. The display controller 334 controls the display of images on the display 332 as well as interactions with the display 332 via user input devices such as a mouse, keyboard, touchpad, or touchscreen. The processor 338 controls operation of the display 332, display controller 334, and inspection tool 336, as well as communications between the device 330 and platform 320.

Although elements of the inspection tool are shown as residing on the platform 320 as well as the user device 330, as described above, the functionality of the inspection tool can be executed at the platform 320, at the user device 330, or distributed between the platform 320, user device 330, the source 310, and potentially other platforms such as a platform of the inspection tool provider. In any case, the inspection tool is operative to provide composite images, as generally shown in FIG. 2, based on a digital image as generally shown in FIG. 1. To do this, the inspection tool monitors user inputs in relation to the digital image 102 displayed on the display device 100. By monitoring such user inputs, the inspection tool can identify an inspection location 106 and define an inspection area 108 in relation to the inspection location 106. For example, the inspection tool may monitor a display controller to determine the display coordinates of the inspection location 106 (e.g., based on the cursor location during hovering movement or at a time of entering a user selection) and then define the inspection area 108 to be centered on the inspection location 106. In the case of a circular inspection area 108, the inspection area 108 may be defined by the coordinates of the inspection location 106 and a radius in relation to the inspection location 106. Inspection areas can similarly be defined having other geometric shapes and positioning in relation to the inspection location 106.

The inspection tool can then access the image information for the portion of the digital image 102 within the inspection area 108 and map that image information to the inspection window 204 of the composite image 202. In this regard, conventional zoom techniques may be implemented which may involve, for example, higher resolution production of the image information within the window, replicating pixels, interpolating or other processing to generate new pixels, or executing advanced processing techniques, e.g. involving AI, for an enhanced zoom image. In addition, various techniques can be employed to remove the security marks from the inspection image portion 206 in the window 204. In some cases, the original information of the digital image 102 may be included with the security mark overlaid or superimposed on the image or separate images with and without the security mark may be available. In such cases, the inspection tool may be able to distinguish between the original image information and the watermark information to remove the watermark information without processing or altering the original image information. In other cases, the watermark information may eliminate or otherwise obscure portions of the original digital image information. In such cases, the inspection tool may identify the watermark information, eliminate the watermark information from the digital image, and reconstruct (if and as necessary) the obscured portions of the digital image to match the content of the original digital image. Various technologies may be employed to identify the security marks and reconstruct the obscured portions of the digital image including text recognition, pattern recognition, image smoothing technology, and artificial intelligence-based logic.

The composite image, including the image information with the security marks ("marked image information") outside of the window and image information without the security marks ("unmarked image information") inside the window, may be presented as a single set of image information including the marked and unmarked image information in the appropriate areas. Alternatively, separate images may be presented including the marked information in a first image and the unmarked image information in a second image. The information for both images can be provided to the display device. The presentation rules of the display device can then be controlled so that the information of the first image is visibly rendered to the user in the area outside the window and the information of the second image is visibly rendered inside the window. For example, the relevant information may be visibly rendered by designating the information as foreground or otherwise controlling the display to make the relevant information visible. The second image may be enlarged in relation to the first image and be spatially registered in relation to the first image so that the portion in the window matches the corresponding portion of the first image. For example, the first and second images may have the same center location relative to the display or the second image may be positionally translated relative to the first image as the user moves the cursor so that a centerpoint of the second image information in the window matches location of the cursor in relation to the first image. It will be appreciated that a portion of the image information may be absent in the display of the composite image due to the zoom effect.

Figure 4:
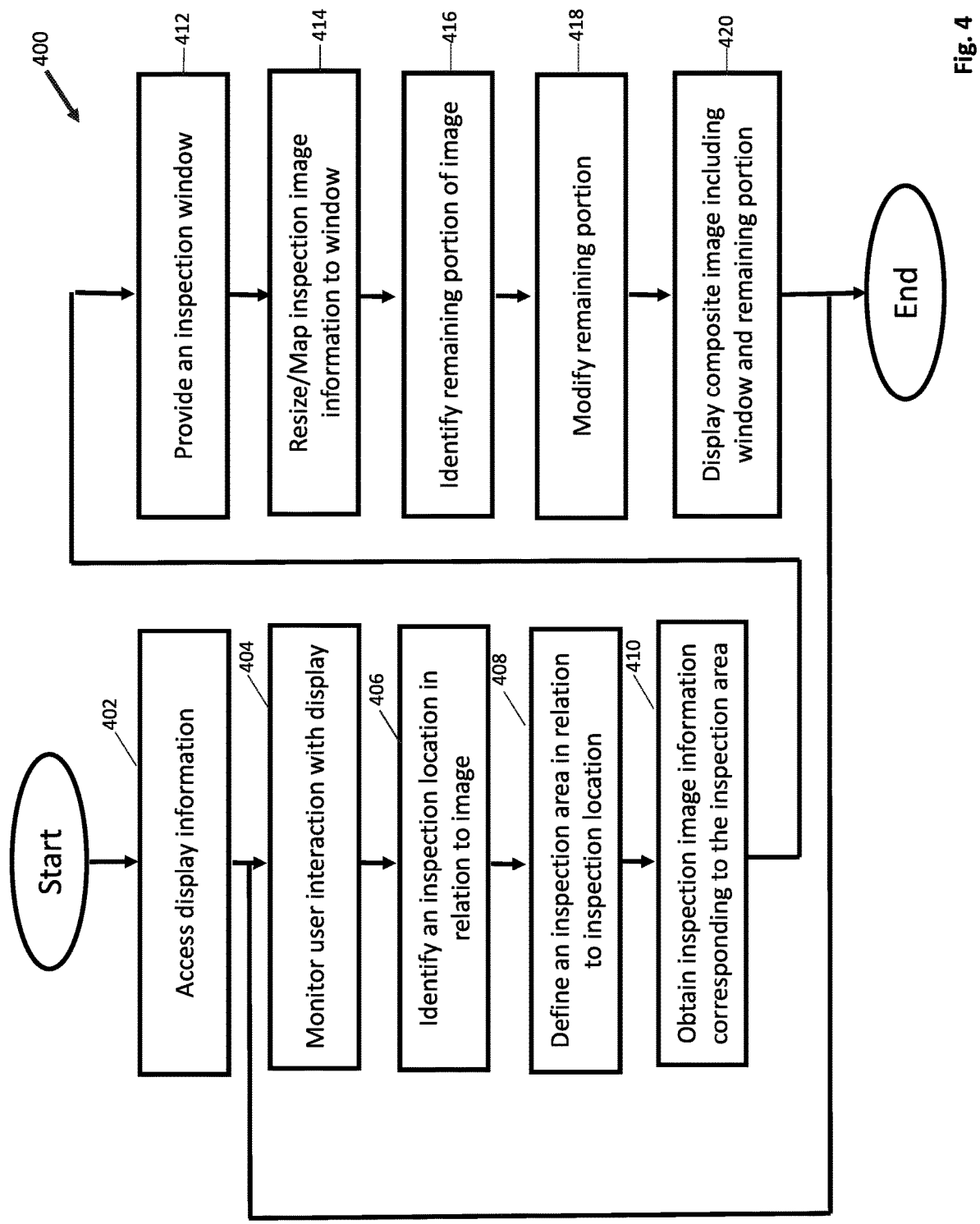
FIG. 4 shows a process for inspecting digital images through security marks in accordance with the present invention.

FIG. 4 is a flowchart illustrating a process 400 for secure inspection of digital images in accordance with the present invention. The illustrated process 400 is initiated by operating an inspection tool to access (402) display information. For example, an inspection tool resident at least in part on a user device, may monitor signals of a display. The tool may further monitor (404) user interaction with the display. This may involve monitoring signals from a user input device as well as a display controller. In this manner, for example, the tool can identify a position of a cursor or similar graphical element in relation to a digital image e.g., during hovering or in connection with a user selection input. Based on such monitoring, the tool can identify (406) an inspection location in relation to a digital image. The inspection location may be, for example, the coordinates of a cursor device or similar element in relation to the digital image.

Using the inspection location, the tool can then define (408) an inspection area. For example, a circular inspection area can be defined using the inspection location and a radius. The radius is preferably sufficiently small that the inspection area comprises a relatively insignificant portion of the overall digital image. For example, the inspection area (regardless of shape) may be defined so that it comprises no more than a small percentage of the overall digital image, for example, less than 5% of the overall digital image or less than 1% of the image. The tool can then obtain (410) inspection image information corresponding to the inspection area. For example, this may involve obtaining information for all pixels of the original digital image that are within the boundary of the inspection area. Depending on the specific implementation, the tool may be able to acquire image information free from security marks or may acquire image information together with security marks.

The tool can then provide (412) an inspection window. The inspection window may be defined in relation to a composite image that is a modified copy of the digital image as described below. For example, the inspection window may be the same size as the inspection area or may be enlarged. In the case of an enlarged inspection window, the inspection window may have the same shape as the inspection area but increased dimensions, e.g., a larger radius. The inspection image information may then be resized as necessary and mapped (414) to the inspection window. As noted above, a variety of zoom technologies may be used in connection with resizing. A remaining portion of the digital image may then be identified (416). Generally, the remaining portion comprises the section of the original digital image that is outside of the inspection window. The remaining portion may be defined, for example, by subtracting the coordinates of the inspection window from the digital image.

Optionally, the remaining portion of the composite digital image may be modified (418) in relation to the corresponding portion of the original digital image. For example, the remaining portion may be converted from color to black-and-white, may be rendered in faded colors, may be greyed-out, may be rendered in reduced resolution, or may be distorted such as by blurring. Generally, the remaining portion will retain the security markings. The composite image including the inspection window and the remaining portion can then be displayed (420) on the display device of the user. This process may be repeated as the user moves the inspection area around the screen of the display device to inspect different portions of the digital image.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for enabling secure inspection of a digital image, comprising:
   providing a display device for displaying digital images;
   first operating said display device to display a first digital image having a security mark, wherein said security mark is rendered on a first area of said first digital image;
   providing an inspection tool to enable inspection of digital images through security marks; and
   operating said inspection tool for:
   receiving a user input for controlling a position of an inspection window with respect to said display device;

responsive to said user input, operating said display device to position said imaging window over at least a portion of said first area; and controlling said display device to display, in said window, an inspection area corresponding to said portion of said first digital display free from said security mark.

2. The method of claim 1, wherein said security mark comprises a watermark.

3. The method of claim 1, wherein said inspection tool is operative for accessing image information corresponding to said first digital image, distinguishing first imaging information corresponding to said first digital image from second image information corresponding to said security mark, and rendering said first information for display in said window.

4. The method of claim 1, wherein said inspection tool is operative for identifying an inspection location from said user input, establishing said inspection area in relation to said inspection location, correlating said inspection area to inspection image information, and mapping said inspection image information to said window to display an inspection image portion.

5. The method of claim 4, wherein said inspection image portion is enlarged as displayed in said window relative to said size of said inspection area in said first image.

6. The method of claim 5, wherein said inspection tool is operative for displaying a composite image including said inspection image portion in said window and a remaining portion of said first image outside of said window, wherein said remaining portion is modified in relation to a corresponding portion of said first image.

7. The method of claim 6, wherein said remaining portion is chromatically altered in relation to said corresponding portion of said first image.

8. The method of claim 6, wherein said remaining portion has a reduced resolution in relation to said corresponding portion of said first image.

9. The method of claim 6, wherein said remaining portion is distorted in relation to said corresponding portion of said first image.

10. The method of claim 1, wherein said inspection location corresponds to a position of said cursor in relation to said first image.

11. A system for enabling secure inspection of a digital image, comprising:

a display device for displaying digital images, wherein said display device is operative to display a first digital image having a security mark, wherein said security mark is rendered on a first area of said first digital image; and an inspection tool to enable inspection of digital images through security marks;

wherein said inspection tool is operative for:

receiving a user input for controlling a position of an inspection window with respect to said display device;

responsive to said user input, first controlling said display device to position said imaging window over at least a portion of said first area; and second controlling said display device to display, in said window, an inspection area corresponding to said portion of said first digital display free from said security mark.

12. The system of claim 11, wherein said security mark comprises a watermark.

13. The system of claim 11, wherein said inspection tool is operative for accessing image information corresponding to said first digital image, distinguishing first imaging information corresponding to said first digital image from second image information corresponding to said security mark, and rendering said first information for display in said window.

14. The system of claim 11, wherein said inspection tool is operative for identifying an inspection location from said user input, establishing said inspection area in relation to said inspection location, correlating said inspection area to inspection image information of said first image, and mapping said inspection image information to said window to display an inspection image portion.

15. The system of claim 14, wherein said inspection image portion is enlarged as displayed in said window relative to said size of said inspection area in said first image.

16. The system of claim 15, wherein said inspection tool is operative for displaying a composite image including said inspection image portion in said window and a remaining portion of said first image outside of said window, wherein said remaining portion is modified in relation to a corresponding portion of said first image.

17. The system of claim 16, wherein said remaining portion is chromatically altered in relation to said corresponding portion of said first image.

18. The system of claim 16, wherein said remaining portion has a reduced resolution in relation to said corresponding portion of said first image.

19. The system of claim 16, wherein said remaining portion is distorted in relation to said corresponding portion of said first image.

20. The system of claim 11, wherein said inspection location corresponds to a position of said cursor in relation to said first image.

* * * * *